INVENTOR.
WILLIAM KIRBY WESTON

Patented May 31, 1949

2,471,468

UNITED STATES PATENT OFFICE 2,471,468

REPEATERED SUBMARINE SIGNALING CABLE

William Kirby Weston, London, England, assignor to International Standard Electric Corporation, New York, N. Y.

Application October 22, 1946, Serial No. 704,967 In Great Britain June 18, 1945

Section 1, Public Law 690, August 8, 1946 Patent expires June 18, 1965

3 Claims. (Cl. 174—70)

This invention relates to improvements in repeatered submarine signalling cables and more particularly to the kind in which the repeaters are so constructed as to form part of the finished cable and to be laid with it.

In connection with the development of such repeaters for use in submarine telephone cables, it is desirable to encase the metal case containing the repeater with a water-repellent material such as Polythene which can be joined to the dielectric of the submarine cable, thus providing a continuous and homogeneous covering of water-repellent material continuously throughout the length of the submarine cable and including the repeater, or repeaters, contained in the circuit.

If the submarine cable is of the coaxial type in which the return conductor of the submarine cable is effectively in contact with the water in which the cable is submerged, then it is necessary at the repeating point to make a connection between the external conductor of the coaxial cable and the case of the repeater unit in order to transfer to it the signal being transmitted by the cable.

If a direct connection is made through the layer of water-repellent material encasing the repeater unit, then the seepage path for water will be very short. The object of this invention is to enable such a connection to be made in which the seepage path is long, that is, of the order of several feet.

According to this invention, a repeatered coaxial submarine signalling cable of the kind in which the outer conductor of the cable is effectively in contact with the water in which the cable is submerged and a repeater is so constructed and arranged as to form part of the finished cable and to be laid with it, the repeater being surrounded by a water-repellent dielectric joined to the dielectric of the submarine cable, is characterized by the feature that the repeater or its case is electrically connected to the outer conductor of the coaxial cable by means of a conducting lead of essentially greater length than the distance between the repeater case and the point where the lead is connected to the outer conductor, the conducting lead having a spiral, zig-zag, or the like shape, and being embedded within the dielectric.

In a specific embodiment of the invention, a connection is taken from the outer conductor of the cable at a point where the cable enters the structure supporting the repeater unit and the conducting lead is spiralled round the central conductor of the cable.

In another embodiment of the invention, a connection is taken from the outer conductor of the cable at a point where the cable enters the structure supporting the repeater unit and the conducting lead forms a zig-zag structure passing backwards and forwards through the length of the dielectric between the end of the cable and the actual repeater casing. The zig-zag structure may substantially surround the central conductor of the cable. In any case, the conducting lead may be insulated with a thermoplastic material before it is embedded in the dielectric. In a method, according to the invention, of making such a cable, the dielectric in which the conducting lead is embedded may be introduced into the cable after the connection between the repeater or its case and the outer conductor of the coaxial cable has been made.

The said dielectric may be introduced into the cable under pressure by injection moulding.

The said dielectric may be introduced into the cable at such a temperature that it forms a substantially homogeneous joint with the cable dielectric, and may be caused to form also a substantially homogeneous joint with insulating material enclosing the repeater unit.

Alternatively, the said dielectric may be caused to flow around the repeater unit so as to enclose it.

The repeater unit may be joined to a piece of stub cable which is subsequently joined to the main cable in the ordinary manner.

To make the invention clearly understood, reference will now be made to the accompanying drawings, which are given by way of example only, and in which.

In both figures the same parts are indicated by the same reference numerals.

Figure 1:
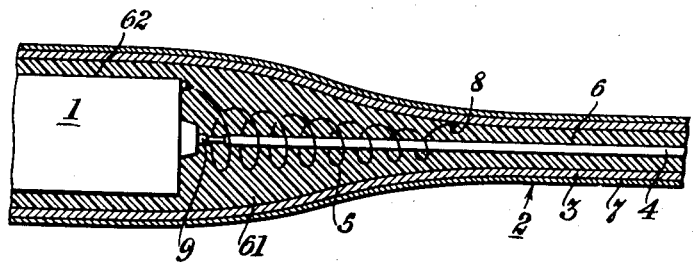
Fig. 1 illustrates a specific embodiment of the invention.
Figure 2:
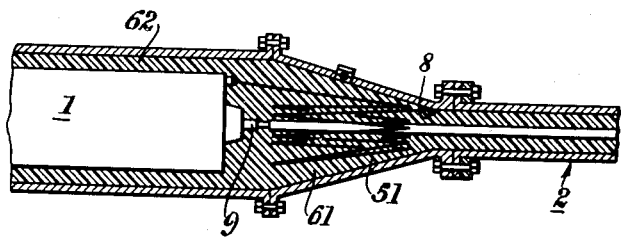
Fig. 2 illustrates another embodiment of the invention.

Referring first to Fig. 1, a submarine cable 2 is illustrated comprising an inner conductor 4 and a coaxial outer conductor 3, both being insulated from each other by insulating material 6, for example Polythene. The repeater unit is indicated by reference numeral 1 and the armouring of the cable by reference numeral 7. A connection is made to the outer conductor 3 of the coaxial cable at a point 8, where the submarine cable 2 is joined with that portion of the unit in which the repeater is located, by means of a conducting lead 5 spiralled round the central conductor 4 of the cable 2, and connected with the insulated terminal 9 of the repeater unit 1. The lead 5 is embedded in a body 6 of water-repellent material, which, for example, may be introduced under pressure by injection or by other means. If the connection is made in the form of a spiral, it will have an inductive effect. If, however, it is desired that the connections should be non-inductive, then it can be applied not as a spiral but in the form of a zig-zag connection 51 as shown in Fig. 2, passing backwards and forwards through the length of the water-repellent material 6, between the end of the cable and the actual repeater casing.

In any of the embodiments described, the connecting wire 5 or 51 may be previously insulated with a thermoplastic or like material before the case is filled. The insulating medium 6 may be introduced after the joint, between the repeater and the submarine cable, has been made. This may be done by injection moulding or other means and at such a temperature that the material 6 introduced forms a homogeneous joint with the cable dielectric 6 and also with the insulating tube 62 enclosing the repeater unit, or, of course, the injection moulding operation may include the covering of the repeater unit itself. That is to say, the tube 62 is formed during the injection moulding operation by which the material 6 is introduced. Also, the joint may be made initially in the factory between the repeater unit and a piece of stub cable which would then be joined to the main cable by an ordinary joint. It will be appreciated that a long seepage path is provided against penetration of moisture and the conducting lead can be arranged to give an inductive or noninductive effect, as desired.

The types of connection described are only illustrative and the connection may take other forms provided the path is long compared with the direct length connection.

The cable may be protected and armoured in the usual manner, the armouring 7 extending over the repeater units which are not of substantially greater diameter than that of the cable in which they are connected.

What is claimed is:

1. In a repeatered coaxial submarine signalling cable of the kind in which the outer conductor of the cable is effectively in contact with the water in which the cable is submerged and a repeater is so constructed and arranged as to form part of the finished cable and to be laid with it, the repeater being surrounded by a water repellent dielectric joined to the dielectric of the submarine cable, the improvements that comprise a conducting lead embedded in the dielectric spiralled around the central conductor of the cable and electrically connected to the outer conductor of the cable and to the repeater.

2. In a repeatered coaxial submarine signalling cable of the kind in which the outer conductor of the cable is effectively in contact with the water in which the cable is submerged and a repeater is so contructed and arranged as to form part of the finished cable and to be laid with it, the repeater being surrounded by a water repellent dielectric joined to the dielectric of the submarine cable, the improvements that comprise a conducting lead arranged in the form of a zig-zag structure passing backwards and forwards through the length of and embedded in the dielectric between the end of the cable and the repeater, and electrically connected to the outer conductor of the cable and to the repeater.

3. A cable as defined in claim 2 wherein the zig-zag structure substantially surrounds the central conductor of the cable.

WILLIAM KIRBY WESTON.

REFERENCES CITED

The following references are of record in the file of this patent:

UNITED STATES PATENTS

| Number | Name | Date |
|---|---|---|
| 1,063,396 | Seibt | June 3, 1913 |
| 2,036,414 | Jore | Apr. 7, 1936 |
| 2,110,457 | Wentz | Mar. 8, 1938 |
| 2,421,444 | Tyne | June 3, 1947 |

FOREIGN PATENTS

| Number | Country | Date |
|---|---|---|
| 559,014 | Great Britain | Feb. 1, 1944 |